United States Patent [19]

McEwen

[11] Patent Number: 5,662,812

[45] Date of Patent: *Sep. 2, 1997

[54] TROUGH SYSTEM FOR MACHINE TOOL COOLANT COLLECTION FLUMES

[75] Inventor: Stephen N. McEwen, Bowling Green, Ohio

[73] Assignee: Henry Filters, Inc., Bowling Green, Ohio

[*] Notice: The term of this patent shall not extend beyond the expiration date of Pat. No. 5,300,220.

[21] Appl. No.: 661,801

[22] Filed: Jun. 11, 1996

Related U.S. Application Data

[63] Continuation of Ser. No. 386,223, Feb. 9, 1995, which is a continuation of Ser. No. 222,963, Apr. 5, 1994, which is a continuation of Ser. No. 905,444, Jun. 29, 1992, Pat. No. 5,300,220.

[51] Int. Cl.[6] ................................................. B01D 17/12
[52] U.S. Cl. .................. 210/805; 210/154; 210/167; 210/171; 405/74; 405/121; 137/602
[58] Field of Search .................................. 210/154, 167, 210/170, 171, 767, 805; 405/44, 74, 119, 120, 121; 137/13, 602

[56] References Cited

U.S. PATENT DOCUMENTS

| | | | |
|---|---|---|---|
| 1,456,759 | 5/1923 | Booth | 210/170 |
| 3,156,099 | 11/1964 | Dailey | 405/121 |
| 4,655,940 | 4/1987 | Harms | 210/167 |

FOREIGN PATENT DOCUMENTS

| | | |
|---|---|---|
| 513327 | 2/1955 | Italy . |
| 689569 | 4/1965 | Italy . |
| 445194 | 3/1936 | United Kingdom . |

OTHER PUBLICATIONS

Perry's Chemical Engineers Handbook, 6th ed. 1984, pp. 6–54 and 6–55.

*Primary Examiner*—Christopher Upton
*Attorney, Agent, or Firm*—Brooks & Kushman P.C.

[57] ABSTRACT

A machine tool coolant collection flume system (10) for communicating machine tool coolant from machine tools to a filtration system includes a main trough (12) and a tributary trough (14) intersecting the main trough wherein each trough (12,14) slopes downwardly in the direction of machine tool coolant flow and the main trough (12) has a greater cross-sectional area at the downstream side of its intersection with the tributary trough (14) to smoothly accommodate the additional flow of machine tool coolant from the tributary trough (14) without affecting upstream flow. A single large diameter flush nozzle (20) provides a low velocity high volume forced coolant flow in the main trough (12) upstream of the intersection by the tributary trough (14) to minimize the creation of mist and turbulence downstream.

4 Claims, 2 Drawing Sheets

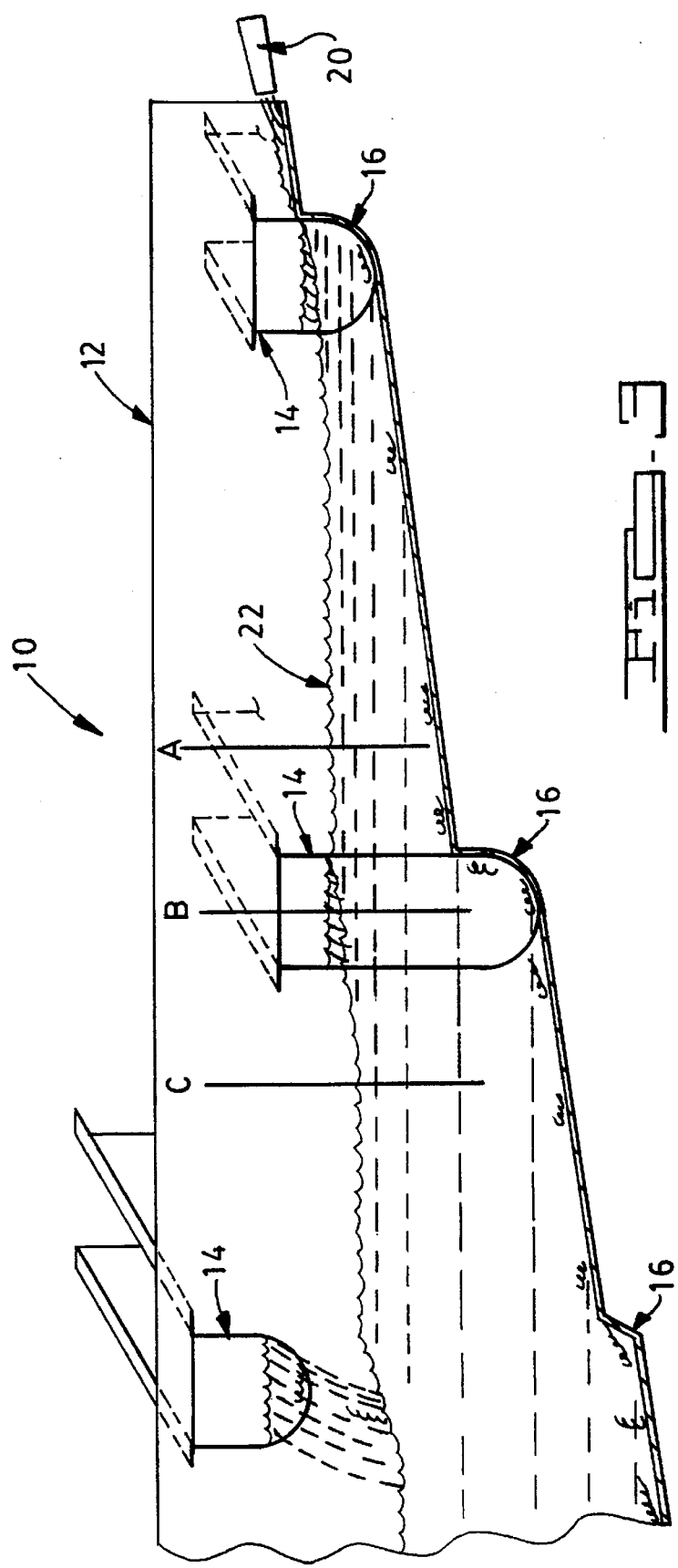

TROUGH SYSTEM FOR MACHINE TOOL COOLANT COLLECTION FLUMES

This is a continuation of copending application Ser. No. 08/386,223 filed on Feb. 9, 1995 which is a continuation of Ser. No. 08/222,963 filed on Apr. 5, 1994 which was a continuation of prior application Ser. No. 07/905,444 filed Jun. 29, 1992, now U.S. Pat. No. 5,300,220.

TECHNICAL FIELD

This invention relates to a flume system for communicating machine tool coolant, and more particularly to uninterruptably maintaining coolant flow in machine tool coolant collection flumes that may have tributary troughs that intersect wherein these troughs incorporate reduced slopes as flow volumes increase so that coolant velocity is maintained at a desired uniform rate and so that terminal invert is minimized.

BACKGROUND ART

Conventional machine tool coolant collection flumes include a single trough that communicates machine tool coolant from a machine tool to a filtering station. In the alternative, a main trough is intersected by tributary troughs that communicate machine tool coolant from a plurality of machine tools to the main trough and the trough in turn communicates the machine tool coolant therein to the filtering station. Such systems are disclosed in assignee's earlier U.S. Pat. No. 4,655,940 and often include a plurality of low volume, high velocity flush nozzles to facilitate the coolant flow.

It is at the intersection of the tributary troughs with the main trough that machine tool coolant backs up causing contaminants suspended in the coolant to settle out. Also, turbulence on the surface of the machine tool coolant at the intersection of the main and tributary troughs creates misting, which is undesirable, and foaming, which can cause a pump downstream to cavitate.

U.S. Pat. Nos. 1,431,367; 1,348,554; 1,114,573; 1,042,792; and 1,434,337 disclose channel flow systems and were uncovered during a search conducted on the invention.

DISCLOSURE OF INVENTION

An object of the present invention is to provide an improved collection flume system for communicating machine tool coolant that maintains and promotes coolant flow of uniform velocity.

Another object of the invention is to provide an improved collection flume system for communicating machine tool coolant that reduces misting and foaming associated with confluence areas in the machine tool coolant system.

A further object of the invention is to provide an improved collection flume system where machine tool coolant can be added to the system without effecting upstream coolant flows.

A still further object of the invention is to eliminate the need for high velocity flush nozzles closely and uniformly spaced throughout the length of the main trough and its tributaries.

In carrying out the above objects and other objects of the invention, the improved collection flume system for communicating machine tool coolant includes a main trough and tributary trough(s) intersecting the main trough. Each trough is sloped downwardly in the direction of machine tool coolant flow to facilitate the flow of the machine tool coolant by gravity. The main trough increases in cross-sectional area at the downstream side of its intersection with the tributary trough to smoothly accommodate the additional flow of coolant from the tributary trough in the system.

Preferably, the increase in cross-sectional area in the main trough is provided by a step down section in the main trough. Both sloping and discrete step down profiles facilitate the additive flow condition at the intersection, although a sloping step down is preferable.

In an alternative arrangement, the main trough width is increased at the downstream side of its intersection with the tributary trough to smoothly accommodate the additional flow of the coolant from the tributary trough in the system.

Preferably, a single flush nozzle provides forced coolant flow in the main trough upstream of the intersection of the tributary trough and the main trough. Preferably, a large diameter flush nozzle is utilized to provide a large flow with a low velocity to minimize the creation of mist and turbulence.

In the preferred embodiments of the invention, the surface of the machine tool coolant is maintained at a constant slope and parallel to the slope of the trough bottom surface when flowing in an equilibrium condition in the main trough through sizing of the main trough upstream and downstream of its intersection with a tributary trough.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 3 is a sectional elevational view of a flume system of the present invention illustrating the generally uniform profile of the surface of machine tool coolant in the system.

BEST MODE FOR CARRYING OUT THE INVENTION

Figure 1:
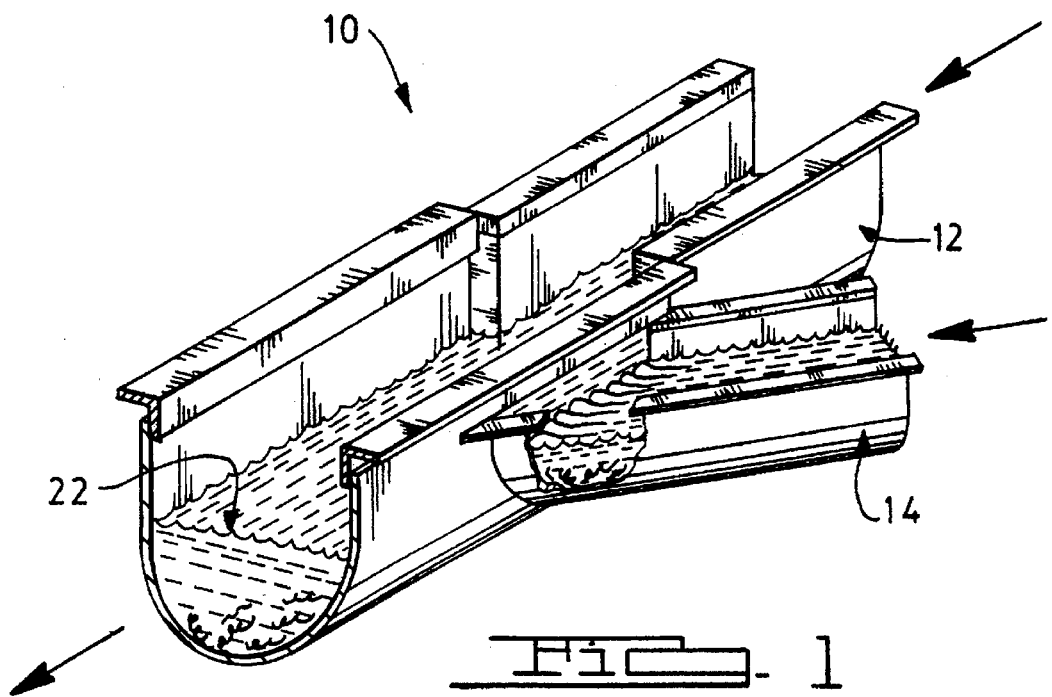
FIG. 1 is a sectional perspective view of a flume system for communicating machine tool coolant constructed in accordance with the present invention.
Figure 2:
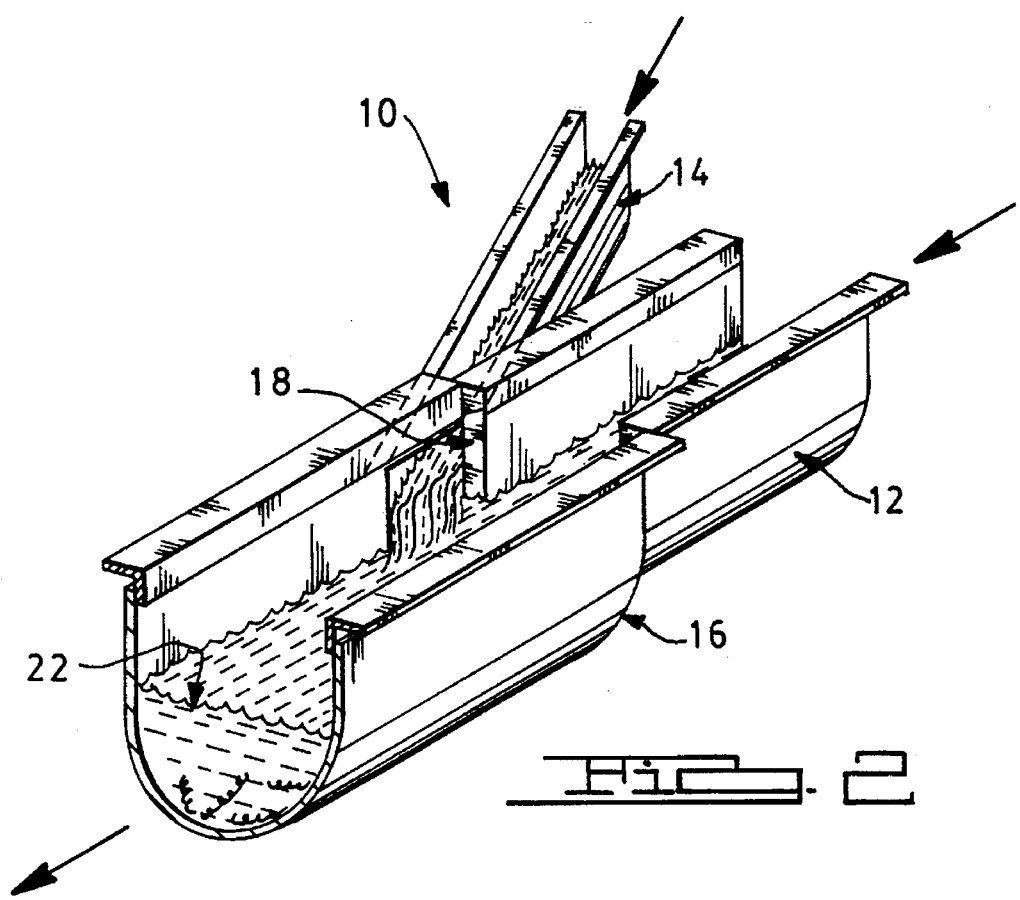
FIG. 2 is a sectional perspective view of a flume system for communicating machine tool coolant constructed in accordance with an alternative arrangement of the present invention.

Referring to FIGS. 1-3 of the drawings, a flume system for communicating machine tool coolant constructed in accordance with the present invention, is generally indicated by reference numeral 10 and is used in a collection flume system such as that disclosed in assignee's U.S. Pat. No. 4,655,940 which is hereby incorporated by reference. As is hereinafter more fully described, the flume system 10 reduces misting and foaming associated with confluence areas and by elimination of intermediate nozzles in a machine tool collection flume system. Such a system 10 also promotes constant uniform machine tool coolant flow and eliminates the backing-up of machine tool coolant associated with intersecting flows.

As shown in FIGS. 1 and 2, the flume system 10 includes a main trough 12 and a tributary trough 14 intersecting the main trough. Each trough 12,14 slopes downwardly so that the machine tool Coolant flow is assisted by gravity. The direction of machine tool coolant flow is represented by arrows. Main trough 12 has a greater cross-sectional area at the downstream side of its intersection with tributary trough.

14 to smoothly accommodate the additional flow of machine tool coolant from the tributary trough without suddenly increasing the fluid depth at the point of convergence.

In FIG. 1, the cross-sectional area at the downstream side of the intersection of the main trough 12 with the tributary trough 14 is accomplished by providing a step down section 16 in the main trough. The step down profile shown is discrete although a sloped profile step down is within the scope of the invention and preferable.

In FIG. 2, the increase in cross-sectional area at the downstream side of the main trough 12 intersection with the tributary trough 14 is accomplished by providing an enlarged trough width section 18. Also, a combination of the step down section 16 and enlarged trough width section 18 can be utilized to create the greater cross-sectional area in the main trough at the downstream side of its intersection with the tributary trough 14. Enlarging the cross-sectional area of the main trough 12 at the downstream side of the intersection with the tributary trough 14 avoids the situation in which machine tool coolant backs up in the main trough at the intersection causing the flow to slow down and the suspended particulate to fall out of suspension.

In the preferred embodiment of the invention shown in FIG. 3, main trough 12 includes a flush nozzle 20, shown schematically, upstream of the intersection of tributary troughs 14. Flush nozzle 20 is a single, large diameter flush nozzle that provides sufficient machine tool coolant flow to carry machining chips suspended in the coolant from machine tools (not shown) to the filtering system (not shown) where they are removed from the machine tool coolant. Large diameter flush nozzle 20 provides a large volumetric flow of coolant at low velocity which minimizes the creation of mist, with its attendant environmental problems, and turbulence, which can create foaming of the coolant and pump cavitation.

With further reference to FIG. 3, the slope of the surface 22 of the machine tool coolant in the main trough 12 is constant. The increased cross-sectional area at the downstream side of the main trough 12 intersection with each tributary trough 14 is such that the volumetric flow rate downstream of the intersection in the main trough is the sum of the flow rate in the main trough immediately upstream of the intersection and the flow rate in the intersecting tributary trough.

For example, if the flow rate at point A is 1,000 gallons per minute and the input from tributary trough 14 at point B is 800 gallons per minute, then the main trough is enlarged so that the flow rate at point C downstream of the intersection of flows A and B is 1,800 gallons per minute without suddenly increasing the height of the top surface 22 of the fluid.

While the best mode for carrying out the invention has been described in detail, those familiar with the art to which this invention relates will recognize various alternative designs and embodiments for practicing the invention as defined by the following claims.

What is claimed is:

1. A flume system for communicating machine tool coolant carrying suspended contaminants, the flume system comprising:

a main trough having upstream and downstream end portions;

a single coolant source introducing forced coolant flow in the upstream end portion of said main trough, said coolant source providing sufficient volume and low velocity of flow to substantially prevent the formation of misting and foaming of the coolant at said single coolant source;

a plurality of tributary troughs intersecting with the main trough between the upstream and downstream end portions providing additional flow of coolant into the main trough;

the main trough having enlargement portions of greater cross-sectional area at the downstream side of intersections with the respective tributary trough to smoothly accommodate the additional flow of coolant from the tributary troughs while providing flow in the trough of sufficient velocity so that the suspended contaminants remain continuously suspended in the coolant without the need for flush nozzles intermediate of the upstream and downstream end portions.

2. A method for transporting machine tool coolant comprising:

providing a main trough having upstream and downstream end portions;

introducing a forced coolant flow in the upstream end portion of said main trough through a single coolant source, the flow being of sufficient volume and low velocity to substantially prevent the formation of misting and foaming;

introducing additional coolant from a tributary into the main trough between the upstream end and the downstream end portions;

wherein said main trough has an enlargement portion having a greater cross-sectional area at the downstream side of its intersection with the tributary to smoothly accommodate the additional flow of coolant from the tributary trough while maintaining the flow in the main trough at a sufficient velocity so that the suspended contaminants remain continuously suspended in the coolant without the need for flush nozzles intermediate of the upstream and downstream end portions.

3. The method of claim 2 wherein:

the surface of the tool coolant is maintained at a generally constant slope throughout the main trough during coolant flow through the main trough.

4. A method for transporting machine tool coolant comprising:

providing a main trough having upstream and downstream end portions;

introducing a forced coolant flow in the upstream end portion of said main trough through a single coolant source, the flow being of sufficient volume and low velocity to substantially prevent the formation of misting and foaming;

introducing additional coolant from a tributary into the main trough between the upstream end and the downstream end portions;

said main trough having an enlargement portion with a greater cross-sectional area at the downstream side of its intersection with the tributary to smoothly accommodate the additional flow of coolant from the tributary trough while providing flow of sufficient velocity in the main trough so that the suspended contaminants remain continuously suspended in the coolant without the need for flush nozzles intermediate of the upstream and downstream end portions.

* * * * *